W. H. APPLEBY.
AUTOMATIC COUPLING FOR ALL ROLLING STOCK.
APPLICATION FILED SEPT. 14, 1907.
991,467.
Patented May 9, 1911.
3 SHEETS—SHEET 1.
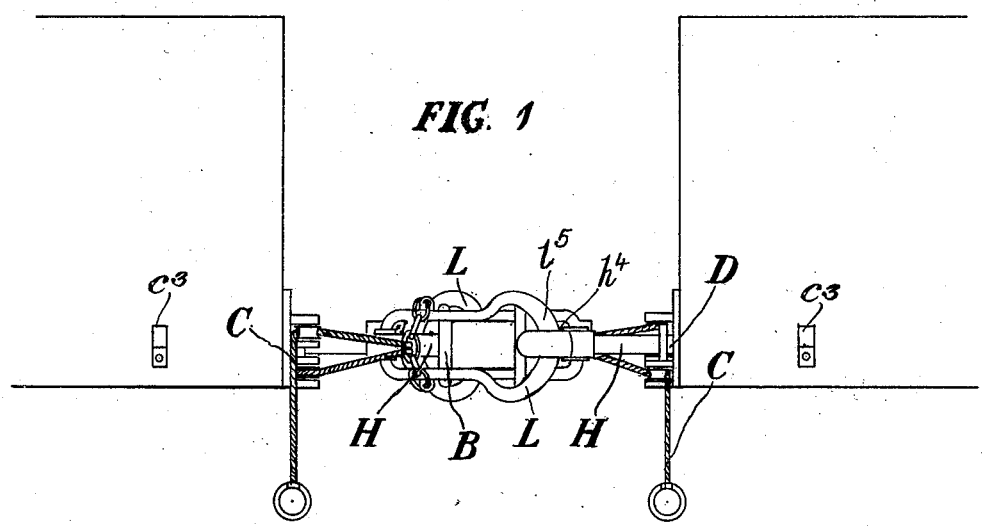
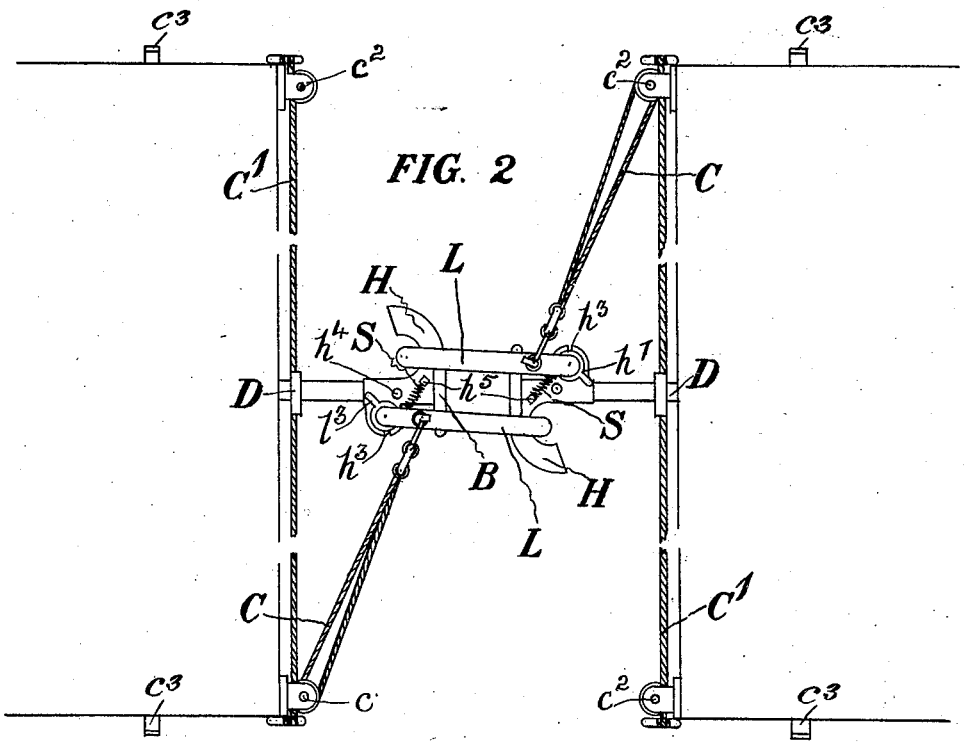
WITNESSES:
INVENTOR,
WILLIAM HENRY APPLEBY,
BY
ATTORNEYS.

W. H. APPLEBY.
AUTOMATIC COUPLING FOR ALL ROLLING STOCK.
APPLICATION FILED SEPT. 14, 1907.
991,467.
Patented May 9, 1911.
3 SHEETS—SHEET 2.
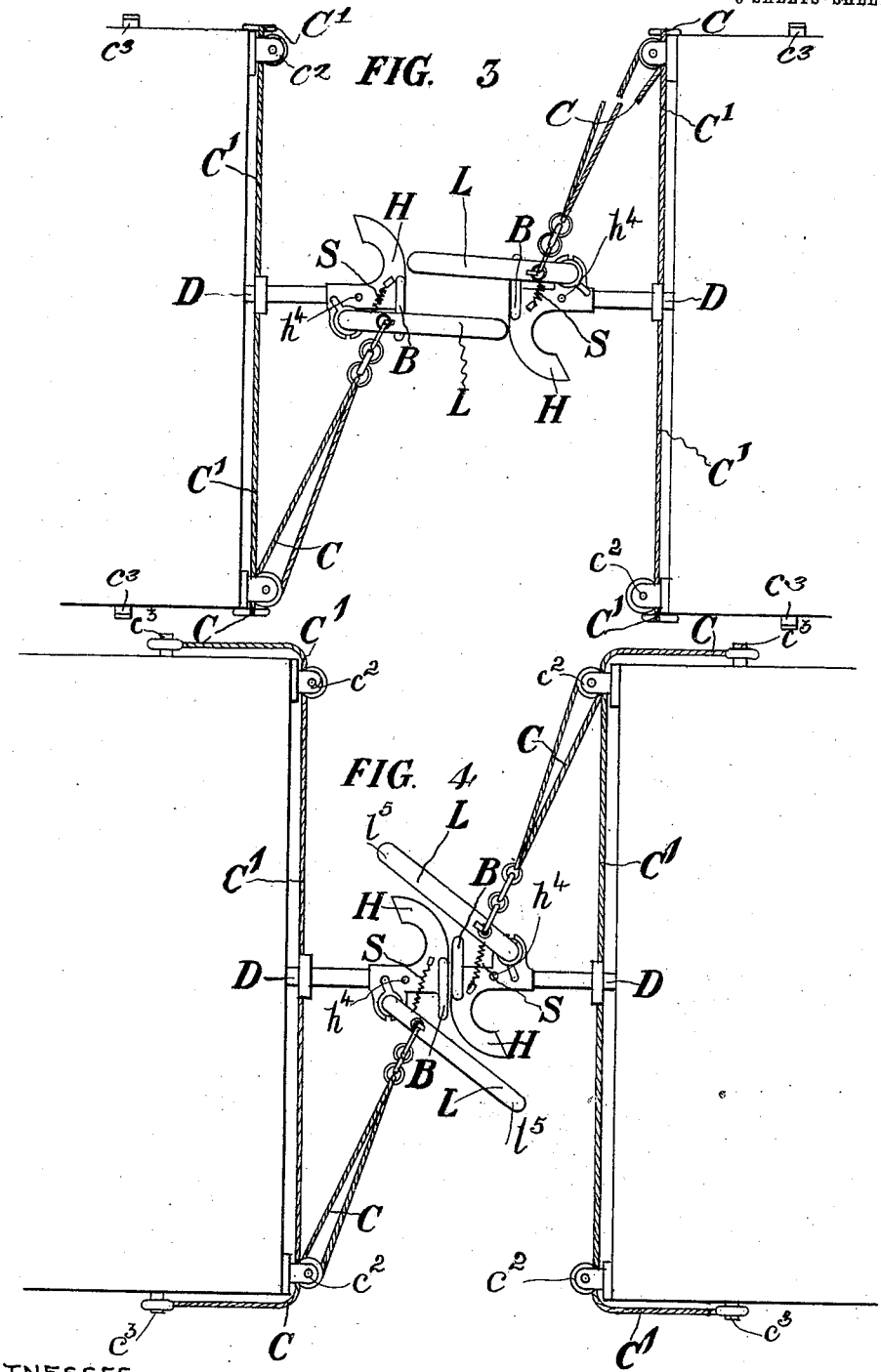
WITNESSES:
INVENTOR,
WILLIAM HENRY APPLEBY,
BY
ATTORNEYS.

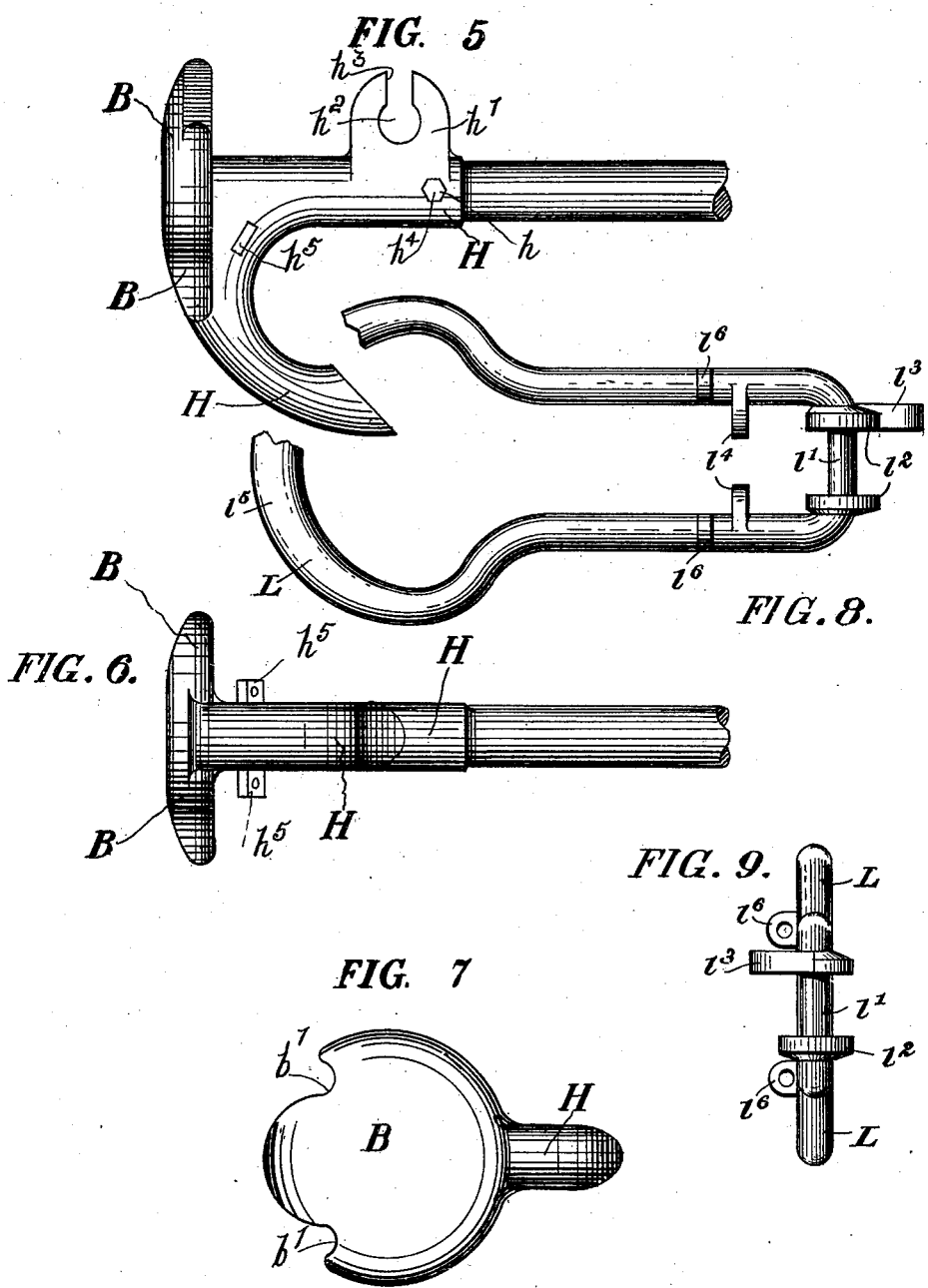

UNITED STATES PATENT OFFICE.

WILLIAM HENRY APPLEBY, OF BLOXWICH, ENGLAND.

AUTOMATIC COUPLING FOR ALL ROLLING-STOCK.

991,467. Specification of Letters Patent. Patented May 9, 1911.

Application filed September 14, 1907. Serial No. 392,932.

*To all whom it may concern:*

Be it known that I, WILLIAM HENRY APPLEBY, a subject of the King of Great Britain, residing at Victoria Works, Bloxwich, in the county of Stafford, England, manufacturer, have invented certain new and useful Improvements in and Relating to Automatic Couplings for all Rolling-Stock, of which the following is a specification.

My invention comprises improvements in and relating to automatic couplings for all rolling stock, and has for its object the provision of a double acting coupling, which shall be operative when either ends of coaches, trucks or wagons, to be coupled meet—that is to say, the coupling is reversible, while being easy and economical to manufacture, and effective and easy of manipulation in use.

Numerous attempts at constructing automatic couplings have been made, the most common comprising a pivotal link on one truck end which meets and rides up a hook on the other truck end, falling over the hook by its weight and coupling the trucks.

This form of coupling is not reversible which renders it quite impracticable for commercial use, and further is not positive in its action, particularly when one of the meeting trucks is loaded and the other light, when the difference in level may bring the pivoted link against the dead center of the hook below the curved or faced portion and a breakage will occur.

This invention has been designed to meet all the requirements demanded, as will be appreciated from the following description.

The invention essentially consists of a pair of links of shape offering considerable accommodation to variation in level of trucks, pivoted on vertical axes, and acting in conjunction with combined buffers and hooks. Links and a buffer and hook are arranged on each truck end and in action the link on each truck end simultaneously engages the hook of the other, special provision for drawing and buffing and also special ways of pivoting the links and forming the hooks are preferably employed, and these will be better appreciated on reference to the explanatory drawings, four sheets of which are appended hereunto in order that the invention may be easily understood and more readily carried into practical effect:

Figure 1. shows in elevation two truck ends with my invention applied thereto. Fig. 2. shows the same in plan. Fig. 3. is a similar view to Fig. 2. showing the action of coupling. Fig. 4. is a similar view but showing the action of uncoupling. Figs. 5, 6, and 7 give details of the hook and buffer, the views being plan, elevation and front view respectively. Figs. 8 and 9 give details of one of the links, the former showing a side elevation and the latter an end view.

These drawings show the invention carried out in the preferred manner, but I do not limit myself absolutely to the details of construction there shown. The hook H is one with, or connected to, the draw bar D; and is stamped or otherwise formed with a buffer front B. From the buffer B the hook projects to one side, the front of the buffer and the hook being preferably of one curve as seen at Fig. 5.

A lug $h^1$ is formed on the side of the hook and is perforated with a central hole $h^2$ and provided with an entrance slot $h^3$ of a width less than the diameter of the hole $h^2$. To the lug $h^1$ the link L is pivoted. For this purpose the link has a shaped end $l^1$ of somewhat rectangular form in cross section and has a bearing disk or collar $l^2$—at each junction of the end $l^1$ with the link. The link $l^1$ is of a size to pass the entrance slot $h^3$ of the lug $h^1$ when turned with its narrow side forward, and the link is pivoted on the lug by passing this end into the hole $h^2$ the bearing disks taking a bearing on each face of the lug and maintaining the link in proper position. Although I prefer this method of pivoting the link, other methods may be used.

The normal position of the link is that shown at Fig. 2, and its movement is clearly shown at Fig. 4; in the extreme position of the link the end $l^1$ would not—as will be seen—come out of the hole $h^2$ of the lug, this only being possible when the link is directly at right angles to the center of the hook and buffer member H. To prevent the movement of the hook to this right angled position a stop in form of a pin or peg, $h^4$, is fitted in a hole in the hook and a snug $l^3$ is formed on one of the collars $l^2$ to engage the same. By these means the link L is securely pivoted on the bar of the hook H yet may, when required, be readily removed by knocking out, or otherwise withdrawing, the split cotter or other form of pin used at $h^4$. The movement of the link L from the normal position is against the action of a spring S. This spring is connected to a small lug $l^4$ on the link and to a lug $h^5$ on the hook and returns the link to its normal position immediately the operating force is removed. At the forward end the link is of an increased width preferably opening out into an approximately circular front.

For operating the links 1, I may employ any suitable means; in the examples shown, a cable is shown as being the most convenient for illustration. Each link has one or more lugs $l^6$ for connection of the chain or cable and from these lugs short lengths of chain may lead to a common ring from which two chains or cables may be led, one for operation from one side of the truck, and the other for the opposite side.

At Figs. 1, 2, 3, and 4, the cable C to each link is for operating from the near side of the truck and the cable $C^1$ is for operating from the far side of the truck. The chains or cables are passed over pulleys $c^2$ at each side as shown for transmitting the pull smoothly and hooks, clips or the like $c^3$ are provided on the sides of the trucks for retaining the free ends of the chains or cables.

In operation, as two trucks meet, the links L meet the curved surfaces of the hooks H and are forced aside against the action of their springs S and pass over the ends of the hooks when they are forced in by the springs and engage the hooks in a proper manner. It will be noticed that the buffer parts B are shaped to form guides $b^1$ for the links, as they return against the buffer under action of the springs and assist in keeping them in proper position. To uncouple the trucks or coaches the cable or chain on each truck on one side is pulled as the trucks buffer and this pulls each link clear of the hook against its spring. As the trucks part again due to the buffer springs the cables are released and the links resume their normal position.

As will be apparent, the shape of the hook or link may be considerably varied without departing from the spirit of my invention.

As will be seen, by a coupling constructed in the manner described, automatic coupling with double action and ready disconnection is provided at a cost probably even less than the usual chain coupling now used as a considerable saving is effected by dispensing with the usual four spring buffers.

What I claim then is:

1. A coupling for rolling stock, comprising the combination of a pair of members, each having a coupling hook provided with a buffing device, a link pivotally connected with said member, and the buffing member having a lateral projection which is engaged by the link and forms a support for same beyond its aforesaid pivotal connection, so as to relieve the pivots of strain.

2. A coupling for rolling stock, comprising the combination of a pair of members, each member having a coupling hook extending from one side thereof and with its forward end formed to constitute a buffing device having a link-support at the side opposite said hook, and a link pivotally connected with the member and formed to be engaged with and supported by said link-support.

In testimony whereof, I, WILLIAM HENRY APPLEBY, have signed my name to this specification in the presence of two subscribing witnesses, this fourth day of September 1907.

WILLIAM HENRY APPLEBY.

Witnesses:
F. GILBERT BRETTELL,
J. BEAUMONT PERCIVAL.

---

Copies of this patent may be obtained for five cents each, by addressing the " Commissioner of Patents, Washington, D. C."